(12) United States Patent
Hamakawa et al.

(10) Patent No.: US 8,184,703 B2
(45) Date of Patent: *May 22, 2012

(54) INTERPOLATED FRAME GENERATING METHOD AND INTERPOLATED FRAME GENERATING APPARATUS

(75) Inventors: Yohei Hamakawa, Fussa (JP); Masaya Yamasaki, Hachioji (JP); Atsuo Shono, Tachikawa (JP); Hiroshi Yoshimura, Saitama (JP); Keiko Hirayama, Tokyo (JP); Ko Sato, Ome (JP); Kenichi Douniwa, Asaka (JP); Yoshihiko Ogawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1209 days.

This patent is subject to a terminal disclaimer.

(21) Appl. No.: 11/947,263

(22) Filed: Nov. 29, 2007

(65) Prior Publication Data
US 2008/0130752 A1 Jun. 5, 2008

(30) Foreign Application Priority Data
Nov. 30, 2006 (JP) ................................. 2006-324479

(51) Int. Cl.
*H04N 7/12* (2006.01)
*H04N 5/14* (2006.01)
*G06K 9/36* (2006.01)

(52) U.S. Cl. .................... 375/240.16; 348/699; 382/236
(58) Field of Classification Search .......................... None
See application file for complete search history.

(56) References Cited

U.S. PATENT DOCUMENTS

| | | | |
|---|---|---|---|
| 5,646,691 A * | 7/1997 | Yokoyama ................. | 348/416.1 |
| 6,590,937 B1 * | 7/2003 | Ogura et al. ............. | 375/240.16 |
| 6,636,267 B1 * | 10/2003 | Adachi ......................... | 348/448 |
| 6,842,483 B1 * | 1/2005 | Au et al. .................. | 375/240.16 |
| 6,968,010 B2 * | 11/2005 | Chelladurai et al. ...... | 375/240.16 |
| 7,079,579 B2 * | 7/2006 | Han et al. .................. | 375/240.16 |
| 2004/0247029 A1 * | 12/2004 | Zhong et al. ............. | 375/240.16 |
| 2004/0252895 A1 * | 12/2004 | Hur et al. ....................... | 382/236 |
| 2005/0025244 A1 | 2/2005 | Lee et al. | |
| 2005/0265451 A1 * | 12/2005 | Shi et al. .................. | 375/240.15 |
| 2006/0072664 A1 * | 4/2006 | Kwon et al. ............. | 375/240.16 |
| 2006/0262853 A1 * | 11/2006 | Li et al. .................... | 375/240.16 |
| 2007/0140346 A1 * | 6/2007 | Chen et al. ............... | 375/240.16 |

(Continued)

FOREIGN PATENT DOCUMENTS
JP 2000-175202 6/2000
(Continued)

*Primary Examiner* — Gary Mui
*Assistant Examiner* — Hicham Foud
(74) *Attorney, Agent, or Firm* — Pillsbury Winthrop Shaw Pittman, LLP (57) ABSTRACT

According to one embodiment, an interpolated frame generator comprises first detector detects potential motion vector by block matching between input frame images, using first block of fixed size, second detector detects motion vector by block matching between the input frame images, using second block having fixed size larger than that of the first block, and generator generates interpolated frame by using the potential motion vector when first detector detects only one potential motion vector, and generates interpolated frame by using a potential motion vector closest to the motion vector detected by the second detector when first detector detects a plurality of motion vectors, wherein first detector includes extractor compares SAD of motion vector with SAD of motion vectors adjacent to the motion vector, and extracts potential motion vector having SAD smaller than any of the SAD of adjacent motion vectors, as a potential motion vector used in generator.

10 Claims, 6 Drawing Sheets

U.S. PATENT DOCUMENTS

2008/0123743 A1 * 5/2008 Douniwa et al. ......... 375/240.15

FOREIGN PATENT DOCUMENTS

| | | |
|---|---|---|
| JP | 2000-201328 | 7/2000 |
| JP | 2001-028754 | 1/2001 |
| JP | 2005-006275 | 1/2005 |
| JP | 2005-056410 | 3/2005 |
| JP | 2006-208792 | 8/2006 |
| JP | 2006-217486 | 8/2006 |

* cited by examiner

INTERPOLATED FRAME GENERATING METHOD AND INTERPOLATED FRAME GENERATING APPARATUS

CROSS-REFERENCE TO RELATED APPLICATIONS

This application is based upon and claims the benefit of priority from Japanese Patent Application No. 2006-324479, filed Nov. 30, 2006, the entire contents of which are incorporated herein by reference.

BACKGROUND

1. Field

One embodiment of the present invention relates to a technique of generating and inserting an interpolated frame between frame images forming moving images, and displaying movement of an object as smooth and natural movement.

2. Description of the Related Art

When moving images are displayed on a liquid crystal display (LCD), the LCD displays frame images (hereinafter simply referred to as "frames") at a rate of, for example, 60 frames/second. The frames are sequential scanning images obtained by processing interlaced signals of 60 fields/second. Specifically, LCDs display one frame for 1/60 second.

When such images displayed on LCDs are viewed, an image of previous frame is left as persistence of vision for viewer's eyes. Therefore, there are cases where a moving object in the images appears blurred, or movement of the object appears unnatural. Such a phenomenon appears more conspicuously in larger screens.

To prevent such blurring of moving images, there is a known method of displaying moving images by inserting an interpolated frame between two sequential frames (refer to Jpn. Pat. Appln. KOKAI Pub. No. 2005-6275). In the method of the reference, matching of image blocks forming frames is performed between two input frames including a prior frame and a subsequent frame or more input frames, and thereby a motion vector of each block (direction and distance of movement of the object) is detected. A new interpolated frame located between the input frames is generated by using the motion vector of each block. The interpolated frame is inserted between the two input frames, and thereby moving images are displayed with increased number of frames.

The above block matching is a method of detecting which image block in a subsequent frame an image block of a predetermined size in a frame matches. A difference between a pixel of one image block in the prior frame and a corresponding pixel of any one image block in the subsequent frame is calculated, and an image block of the subsequent frame having minimum cumulative value of difference (sum of absolute difference [SAD]) is detected as an image block which is most similar to the image block of the prior frame. A difference of position between the most similar blocks of the prior frame and the subsequent frame is detected as a motion vector.

When movement of an object is estimated based on block matching using SAD, if a periodical pattern exists in input frames, an accurate motion vector cannot be estimated in image blocks in the periodical pattern. Jpn. Pat. Appln. KOKAI Pub. No. 2005-56410 discloses a technique of correcting a motion vector of an image block with motion vectors of surrounding image blocks, if an observed image is a periodical pattern. Further, a technique of using blocks of two sizes to detect a motion vector is filed as Jpn. Pat. Appln. No. 2006-208792 (filed on Jul. 31, 2006).

As described above, there are known methods of correcting a motion vector of an image block in a periodical pattern by using motion vectors of surrounding blocks. However, these methods cannot provide appropriate correction in cases where the size of the periodical pattern is much larger than an image block. These methods cannot provide appropriate correction also in cases where the motion vectors of surrounding blocks have low reliability. Therefore, these methods have the problem that a reliable motion vector cannot be obtained in the above cases. This problem becomes conspicuous in cases where an image includes many periodical patterns, and it is required to provide any solution to the problem.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an interpolated frame generating method of generating a new interpolated frame inserted between sequential frames, by using a motion vector obtained by block matching processing to calculate a sum of absolute difference which is a cumulative sum of absolute difference values of pixel values in blocks set in a plurality of input frame images, comprising: a first detecting of detecting at least one potential motion vector by block matching processing between the input frame images, using a first block of a fixed size; a second detecting of detecting a motion vector by block matching processing between the input frame images, using a second block having a fixed size larger than that of the first block; and generating the interpolated frame by using the potential motion vector when the number of the potential motion vector detected by the first detecting is one, and generating the interpolated frame by using a potential motion vector, which is closest to the motion vector detected by the second detecting among the potential motion vectors, when a plurality of motion vectors are detected by the first detecting, wherein the first detecting includes extracting of comparing a sum of absolute difference corresponding to a motion vector with sums of absolute difference corresponding to motion vectors adjacent to the motion vector, for the individual motion vectors, and extracting a potential motion vector having a sum of absolute difference smaller than any of the sums of absolute difference corresponding to the adjacent motion vectors, as a potential motion vector used in the generating, when a plurality of potential motion vectors are detected.

Figure 1:
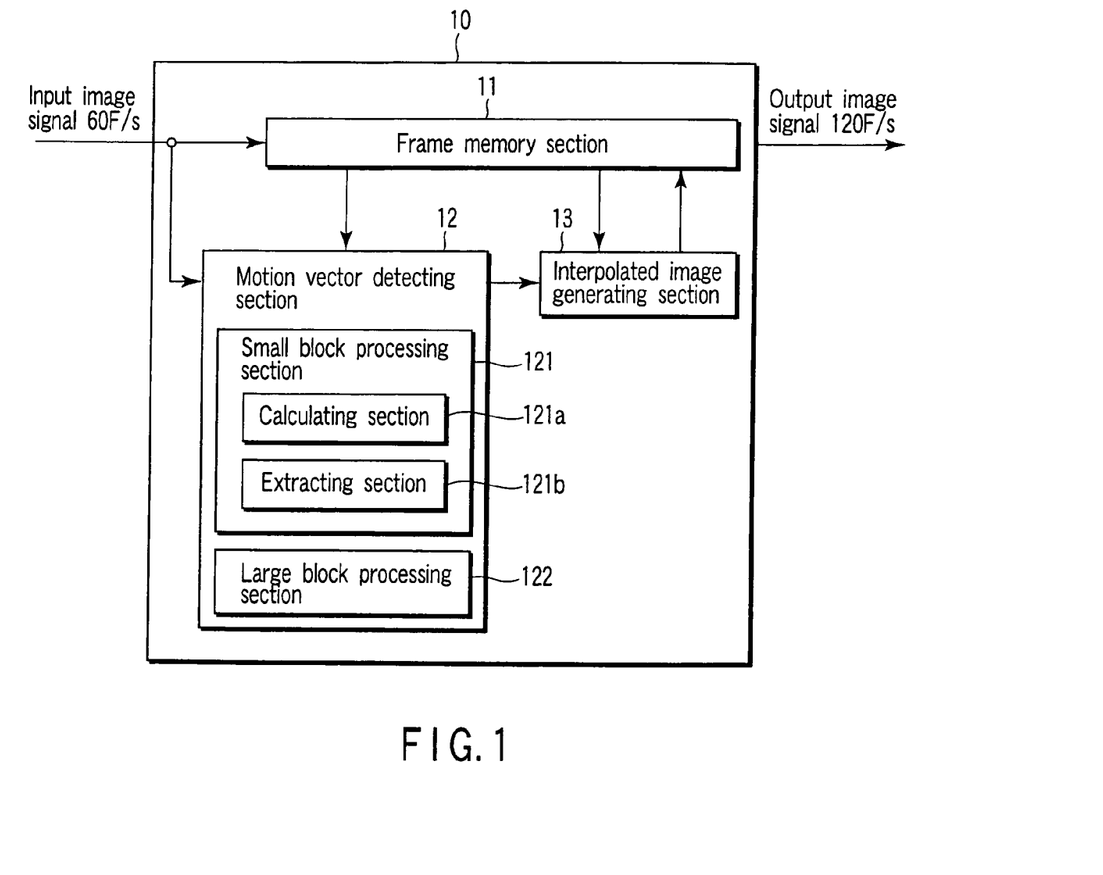
FIG. 1 is a block diagram illustrating an embodiment of an interpolated frame generating apparatus according to the present invention.

According to an embodiment, FIG. 1 is a block diagram illustrating an embodiment of an interpolated frame generating apparatus (frame number changing apparatus) according to the present invention.

An interpolated frame generating apparatus 10 includes a frame memory section 11, a motion vector detecting section 12, and an interpolated image generating section 13. The motion vector detecting section 12 detects a motion vector from, for example, two sequential frames in an input image signal by block matching processing. A frame rate of input image signals is, for example, 60 frames/second.

The interpolated image generating section 13 generates an interpolated frame on the basis of a detection result of the motion vector detecting section 12, and inserts the interpolated frame between the two frames. A frame rate of an output image signal, in which interpolated frames are inserted, is 120 frames/second, for example. The motion vector detecting section 12 and the interpolated image generating section 13 can be formed of hardware using discrete electronic circuits, or software executed by a CPU (not shown).

The motion vector detecting section 12 has a small block processing section 121 and a large block processing section 122. The small block processing section 121 detects potential motion vectors by block matching processing using a block of a fixed size (hereinafter referred to as "small block").

Specifically, the small block processing section 121 has a calculating section 121a. The calculating section 121a calculates an absolute difference value between corresponding pixel values of image blocks in two input frame images. The small block processing section 121 selects a motion vector, which corresponds to a minimum value of SAD of the absolute difference values, as a potential motion vector. The large block processing section 122 detects a motion vector by block matching processing using a large block which is larger in size than the small block.

The interpolated image generating section 13 generates an interpolated frame by using a potential motion vector, when the small block processing section 121 detects only one potential motion vector. In comparison with this, when a plurality of potential motion vectors are detected, the interpolated image generating section 13 generates an interpolated frame by using a potential motion vector, which is most similar to the motion vector detected by the large block processing section 122 among the potential motion vectors.

Figure 2:
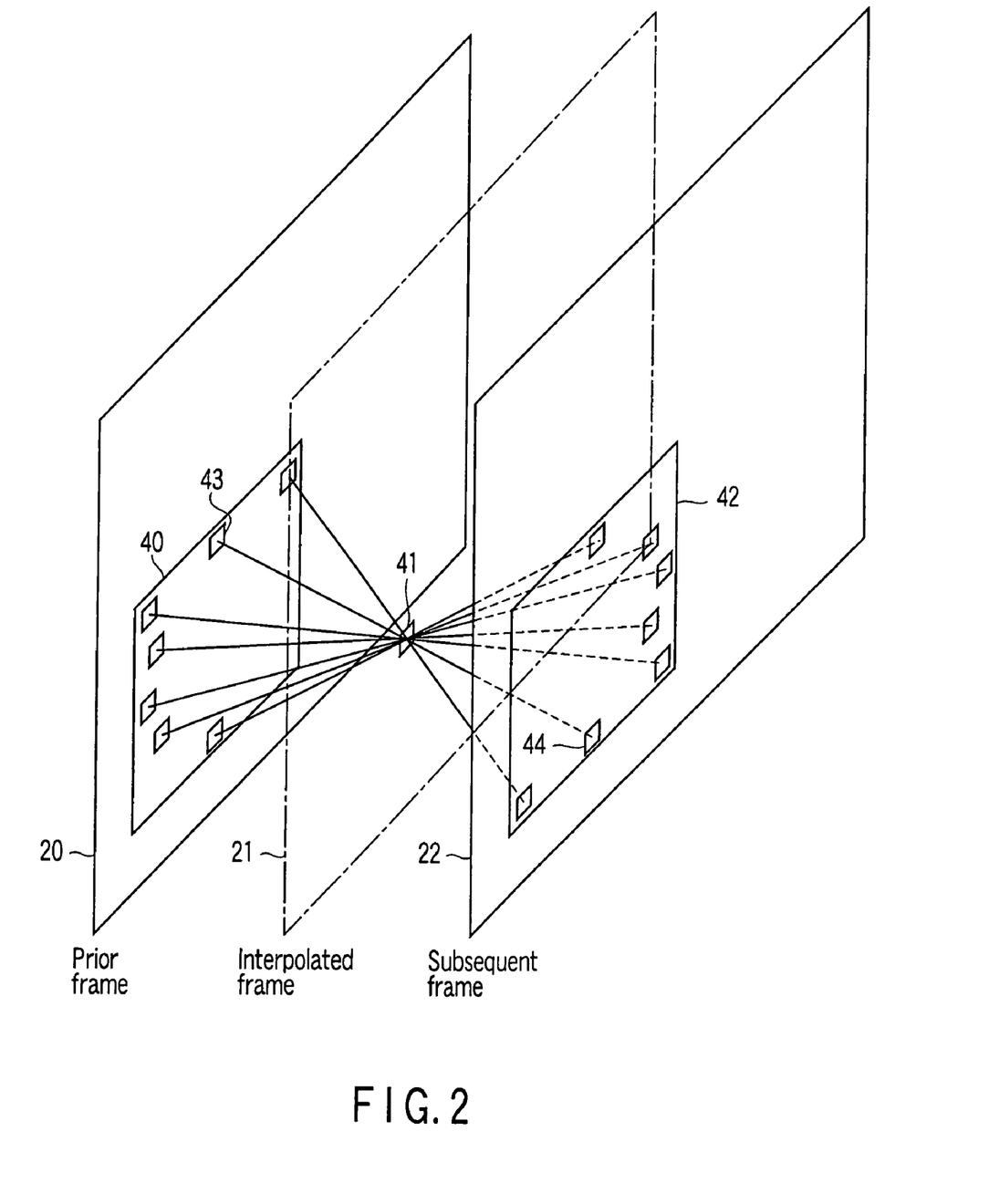
FIG. 2 is a diagram for explaining an example of block matching processing.

FIG. 2 is a diagram illustrating an example of block matching processing. As illustrated in FIG. 2, there is a method of determining a motion vector through block matching processing between image blocks which are symmetric with respect to a point. Specifically, in the method of FIG. 2, an SAD is calculated by comparing image blocks on a prior frame 20 and a subsequent frame 22, which hold an interpolated frame 21 therebetween, pixel by pixel. The image blocks are symmetric with respect to a point in an inserting position of an interpolated image block 41 in an interpolated frame 21. Image blocks of two sizes are used in this processing. A vector which connects most similar image blocks (that is, having the smallest SAD) is determined as a motion vector. This comparison is performed in a predetermined search range 40 in the prior frame 20 and a search range 42 in the subsequent frame 22, which corresponds to the search range 40.

Supposing that an image block 43 and an image block 44 forms a pair of most similar image blocks, a vector from the image block 43 to the image block 44 is determined as a motion vector of the interpolated image block 41. The interpolated image block 41 in the interpolated frame 21 is generated, on the basis of the motion vector and data of the image blocks 43 and 44.

In the method illustrated in FIG. 2, a block of a predetermined size is moved in parallel on two frames holding an interpolated frame therebetween, with respect to a point in an insertion position of the interpolated frame image. Then, a differential value between pixel values of pixels located in corresponding positions on the two frames is calculated for each of the pixels in the block, and a value which is a cumulative sum of the differential values is determined. A direction in which the SAD has a minimum value is determined as a motion vector of the block.

Figure 3:
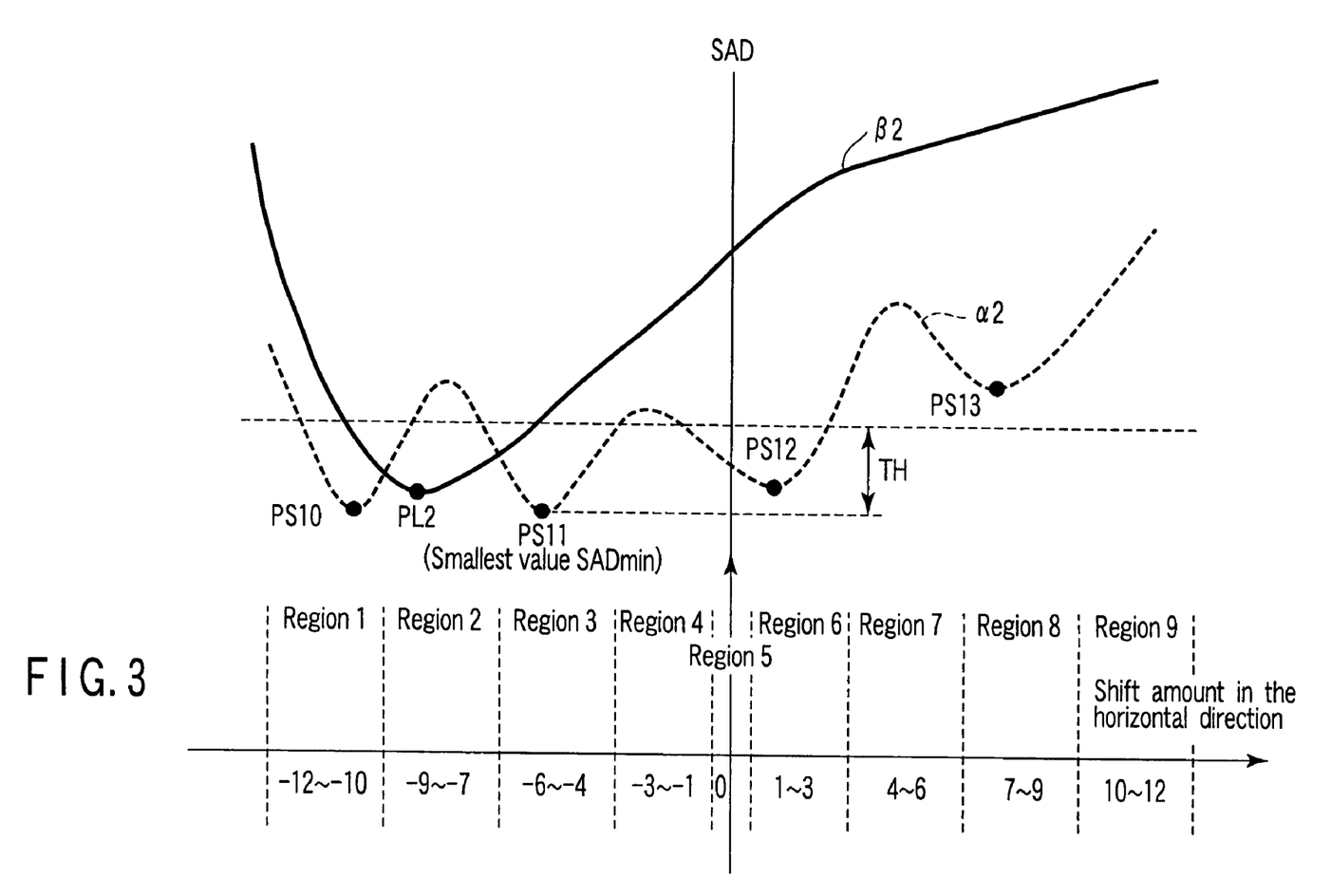
FIG. 3 is a graph illustrating SAD characteristics in block matching processing using a small block and block matching processing using a large block.

FIG. 3 is a graph illustrating relationship (SAD characteristic) between a shift amount of an image block and SAD obtained by block matching using a small block and block matching using a large block. In FIG. 3, the horizontal axis indicates a horizontal shift amount of an image block, and the vertical axis indicates an SAD. The shift amount indicated by the horizontal axis indicates an image block shift amount on the prior frame 20 or the subsequent frame 22. The shift amount of the horizontal axis is divided into 9 regions (Regions 1 to 9), and Region 5 is a region having zero (0) shift amount. The curve α2 indicates a result of block matching processing obtained by using the small block, and the curve β2 indicates a result of block matching processing obtained by using the large block.

Figure 4:
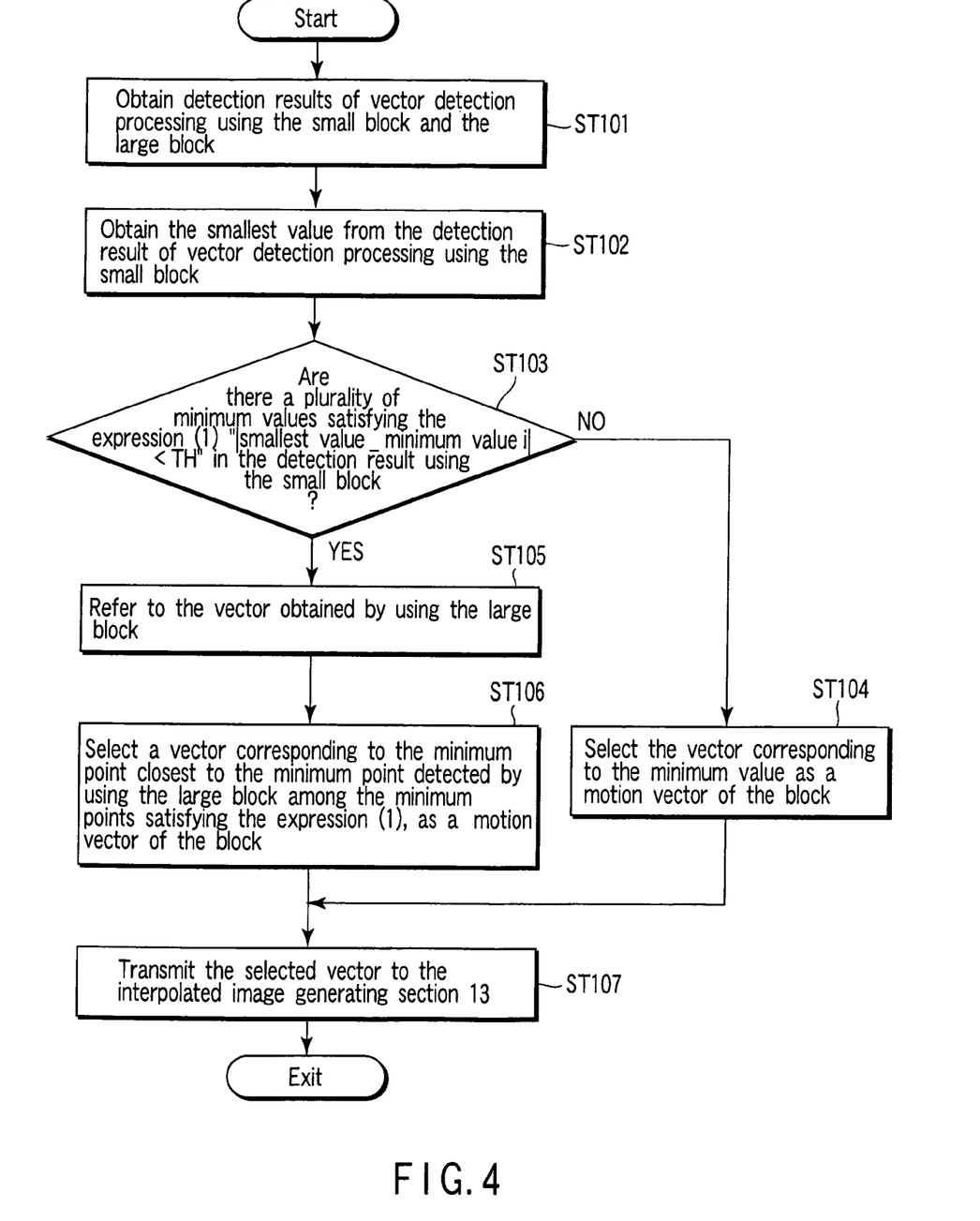
FIG. 4 is a flowchart of a processing procedure of a motion vector detecting section 12 of FIG. 1.

FIG. 4 is a flowchart illustrating a processing procedure of the motion vector detecting section 12 of FIG. 1. The motion vector detecting section 12 obtains respective detection processing results (information of the minimum points) from the small block processing section 121 and the large block processing section 122 (Block ST101).

As shown by the curve a2, when the small block is shifted from −12 pixels to +12 pixels, for example, four minimum points PS10 to PS13 are generated as illustrated in FIG. 3. The motion vector detecting section 12 determines the smallest value SADmin in the whole search region among the group of minimum values of these minimum points supplied from the small block processing section 121 (ST102). The motion vector detecting section 12 selects, as reliable potential motion vectors, motion vectors indicated by SAD minimum values (PS10, PS11, PS12) existing in a predetermined range TH from the smallest value SADmin, that is, minimum values which satisfy the expression "|minimum value−smallest value i|<TH". When there is only one reliable potential motion vector (NO of ST103), the motion vector detecting section 12 supplies information of the SAD minimum point as the motion vector to the interpolated image generating section 13 (ST104).

When there are a plurality of reliable motion vectors (YES of ST103), the motion vector detecting section 12 determines that a periodical pattern exists in the search region, and refers to the motion vector detected by the large block processing section 122 (ST105). The motion vector detecting section 12 adopts a vector indicated by the minimum value PS1 most similar to the minimum value PL2 detected by using the large block among the reliable potential motion vectors, as a motion vector used for generating the interpolated image block 41 (ST106).

In step S106, when there are a plurality of minimum points detected by using the large block, the motion vector detecting section 12 determines that a minimum point having the smallest SAD is the most reliable minimum point (motion vector). As described above, the motion vector detecting section 12 adopts a minimum point which is closest (or most similar) to the most reliable minimum point detected by using the large block among the minimum points (potential motion vectors) detected by using the small block, as a motion vector used for generation of the interpolated image block 41.

To perform block matching, it is necessary that change of pixel values, by which the shape of an object can be recognized, is included in a block. However, for example, when the image includes a horizontal periodical pattern which is wider than the horizontal size of the block, it is impossible to distinguish the movement of the object from a periodical repetitive pattern of an image, and the motion vector detecting accuracy deteriorates.

In the meantime, as illustrated in FIG. 3, when a minimum value is determined for each divided region, there are cases where an undesirable potential motion vector is selected. This is caused by selecting a SAD smallest value for each region. This is explained by using FIG. 5.

Figure 5:
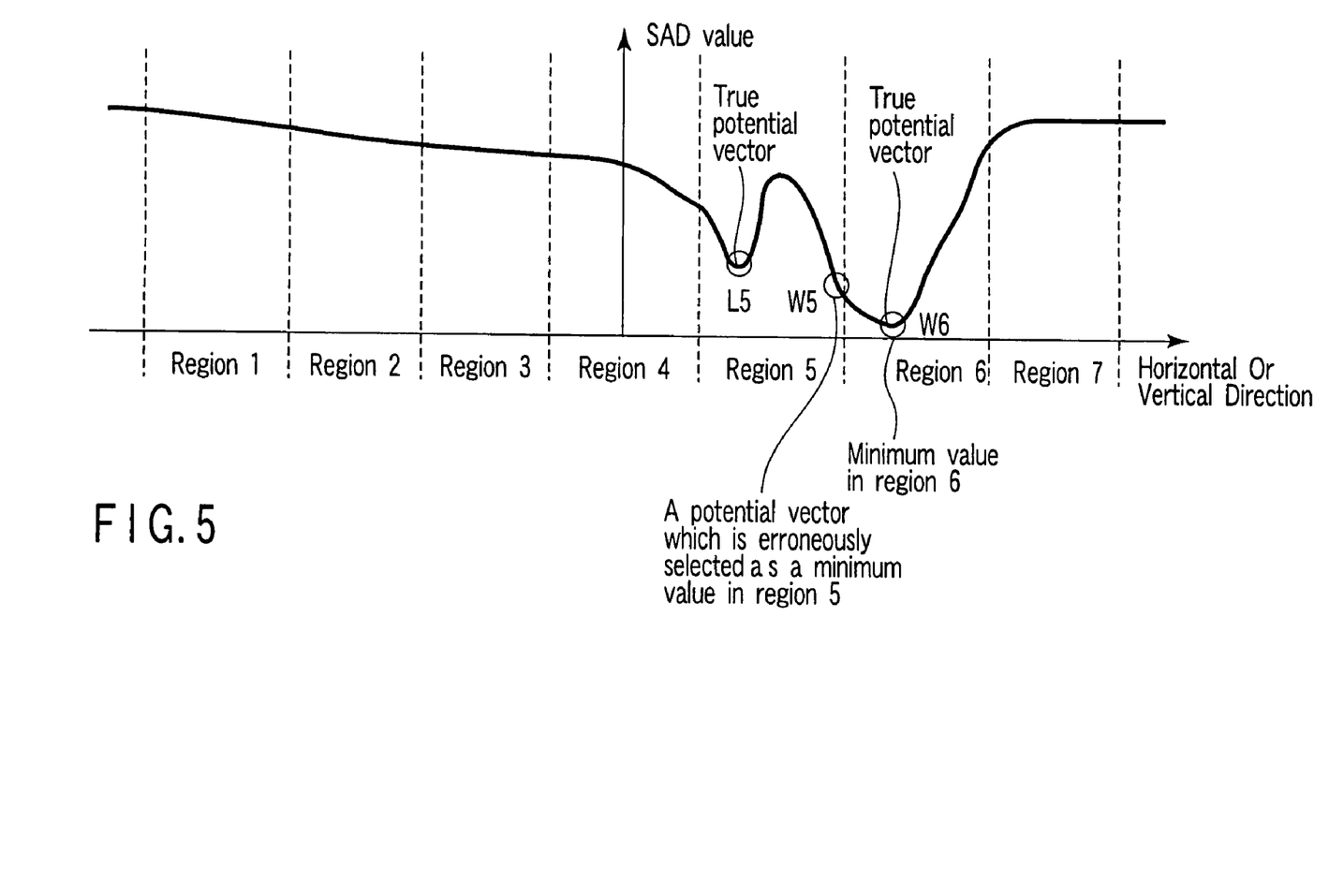
FIG. 5 is a diagram for explaining a case where an undesirable potential motion vector is selected.

FIG. 5 is a diagram for explaining a case where an undesirable potential motion vector is selected. In the method of determining the SAD minimum value for each region, for example, the point W5, which corresponds to a "slope" of the SAD distribution curve is selected as a potential motion vector. Actually, there is a high probability that the point L5, which has a characteristic "projecting downward", is a correct potential motion vector. There are cases where a potential motion vector cannot be accurately selected due to the above phenomenon.

Therefore, according to this embodiment, the motion vector detecting section 12 has an extracting section 121b. When a plurality of potential motion vectors are detected, the extracting section 121b compares an SAD corresponding to a motion vector with SADs of a plurality of motion vectors adjacent to the motion vector, for the individual potential motion vectors. Then, the extracting section 121b extracts a potential motion vector which has an SAD smaller than any of SADs corresponding to the adjacent motion vectors, as a potential motion vector used in the interpolated image generating section 13.

The function of the extracting section 121b is explained with reference to FIGS. 6 and 7. In short, the function of the extracting section 121b is determining a minimum value by performing comparison of adjacent five points (four points excluding the objective point (block)) for the individual potential motion vectors. First, the extracting section 121b selects one motion vector to be used in process. Then, the extracting section 121b compares an SAD value of the selected motion vector with SAD values of adjacent four motion vectors, that is, motion vectors of the upper point, the lower point, the right point, and the left point of the selected motion vector. Then, when the SAD value of the selected motion vector is smaller than the SAD values of the upper, the lower, the right and the left points, the extracting section 121b determines that the point of the selected motion vector is the point satisfying the characteristic "projecting downward" in the graph, and extracts the motion vector as a potential motion vector. The above processing is performed for all the potential motion vectors.

Figure 6:
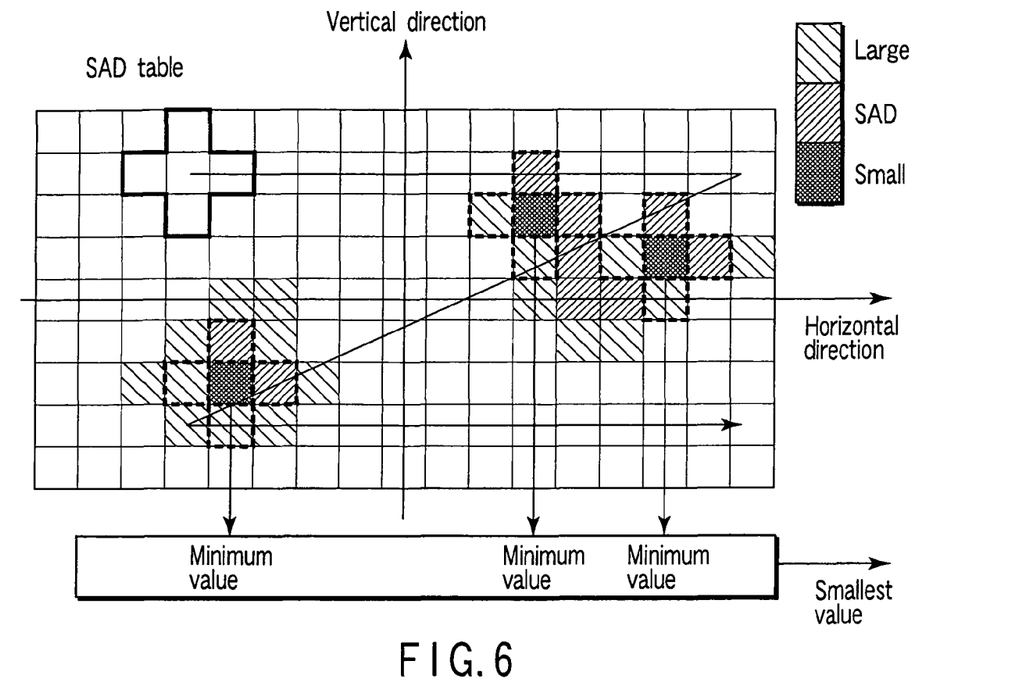
FIG. 6 is a diagram for explaining a function of an extracting section 121b of FIG. 1.
Figure 7:
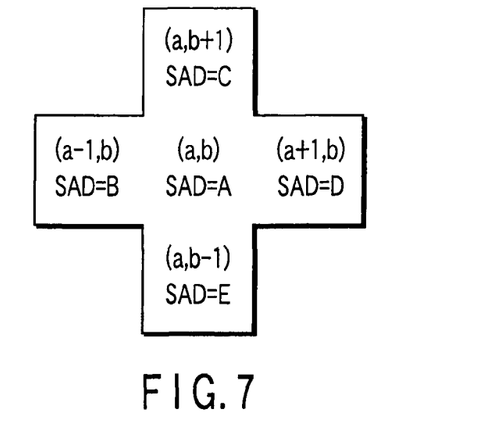
FIG. 7 is a supplementary diagram of FIG. 6.

FIG. 6 illustrates the case where three minimum values are selected. As illustrated in FIG. 7, a potential motion vector is regarded as the center point with the coordinates (a, b), and suppose that an SAD there of is A. Supposing that SAD values of four points surrounding the center point are B, C, D and E, when the condition "A<B, A<C, A<D and A<E" is satisfied, the vector (a, b) is extracted as a potential motion vector.

By the above processing, the point W5 (corresponding to a "slope" of the graph) in Region 5 of FIG. 5 is eliminated from potential motion vectors, and the point L5 which satisfies the condition "projecting downward" is selected as a potential motion vector. Specifically, only motion vectors satisfying the condition "projecting downward" are extracted as potential motion vectors. Therefore, it is possible to provide an interpolated frame generating method and an interpolated frame generating apparatus which can detect a motion vector with high accuracy regardless of the picture pattern of the image.

The present invention is not limited to the above embodiment. For example, instead of performing comparison of adjacent five points, it is possible to perform comparison of adjacent three points, or simply compare SADs of adjacent two points. Adopting these methods reduces the calculation amount. In particular, in comparison of adjacent three points, it suffices to compare an SAD corresponding to the selected motion vector with SADs of two motion vectors which are adjacent to the block in the horizontal direction (or the vertical direction).

Further, the following matter may be considered, in the case where block matching is performed for a part of a stationary object in an image, in which a stationary object such as OSD (On Screen Display) is displayed on a moving background.

Specifically, when a step of using the large block is provided after selecting a plurality of potential motion vectors, there are cases where a potential vector located in the vicinity of (0, 0) vector and indicating a stationary state is not adopted as an ultimate motion vector for generating an interpolated image. Therefore, if the potential motion vectors selected in step ST102 of FIG. 4 includes a potential motion vector located in the vicinity of the origin point (0, 0) on the motion vector space, the processing after step ST102 is omitted. Specifically, when a motion vector having a SAD minimum value within a predetermined range from the origin point (0, 0) is detected, the motion vector is provided to the interpolated image generating section 13 with a high priority. Adopting this method prevents disturbance in generation of an interpolated image of a stationary object due to an incorrect vector.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An interpolated frame generating method of generating a new interpolated frame inserted between sequential frames, by using a motion vector obtained by block matching processing to calculate a sum of absolute difference which is a cumulative sum of absolute difference values of pixel values in blocks set in a plurality of input frame images, comprising:

a first detecting of detecting at least one potential motion vector by block matching processing between the input frame images, using a first block of a fixed size;

a second detecting of detecting a motion vector by block matching processing between the input frame images, using a second block having a fixed size larger than that of the first block; and generating the interpolated frame by using the potential motion vector when the number of the potential motion vector detected by the first detecting is one, and generating the interpolated frame by using a potential motion vector, which is closest to the motion vector detected by the second detecting among the potential motion vectors, when a plurality of motion vectors are detected by the first detecting, wherein, the first detecting includes selecting one motion vector to be used in process when a plurality of potential motion vectors are detected;

comparing a sum of absolute difference value of the selected motion vector with sum of absolute difference values of adjacent a plurality of motion vectors; and extracting the selected motion vector as a potential motion vector when the sum of absolute difference value of the selected motion vector is smaller than the sum of absolute difference values of the adjacent a plurality of motion vectors.

2. The interpolated frame generating method according to claim 1, wherein the extracting is comparing the sum of absolute difference corresponding to the motion vector with sums of absolute difference corresponding to four motion vectors adjacent to the motion vector.

3. The interpolated frame generating method according to claim 1, wherein the extracting is comparing the sum of absolute difference corresponding to the motion vector with sums of absolute difference corresponding to two motion vectors adjacent to the motion vector in the horizontal direction.

4. The interpolated frame generating method according to claim 1, wherein the extracting is comparing the sum of absolute difference corresponding to the motion vector with sums of absolute difference corresponding to two motion vectors adjacent to the motion vector in the vertical direction.

5. The interpolated frame generating method according to claim 1, wherein the extracting is extracting a motion vector detected in the first detecting as a potential motion vector used in the generating, when the motion vector detected in the first detecting has a minimum value of sum of absolute difference within a predetermined range from an origin point on a motion vector space.

6. An interpolated frame generating apparatus which generates a new interpolated frame inserted between sequential frames, by using a motion vector obtained by block matching processing to calculate a sum of absolute difference, which is a cumulative sum of absolute difference values of pixel values in blocks set in a plurality of input frame images, the apparatus comprising:

a first detecting section which detects at least one potential motion vector by block matching processing between the input frame images, using a first block of a fixed size;

a second detecting section which detects a motion vector by block matching processing between the input frame images, using a second block having a fixed size larger than that of the first block; and a generating section which generates the interpolated frame by using the potential motion vector when the number of the potential motion vector detected by the first detecting section is one, and generates the interpolated frame by using a potential motion vector, which is closest to the motion vector detected by the second detecting section among the potential motion vectors, when a plurality of motion vectors are detected by the first detecting section, wherein, the first detecting section includes selecting one motion vector to be used in process when a plurality of potential motion vectors are detected;

comparing a sum of absolute difference value of the selected motion vector with sum of absolute difference values of adjacent a plurality of motion vectors; and extracting the selected motion vector as a potential motion vector when the sum of absolute difference value of the selected motion vector is smaller than the sum of absolute difference values of the adjacent a plurality of motion vectors.

7. The interpolated frame generating apparatus according to claim 6, wherein the extracting compares the sum of absolute difference corresponding to the motion vector with sums of absolute difference corresponding to four motion vectors adjacent to the motion vector.

8. The interpolated frame generating apparatus according to claim 6, wherein the extracting compares the sum of absolute difference corresponding to the motion vector with sums of absolute difference corresponding to two motion vectors adjacent to the motion vector in the horizontal direction.

9. The interpolated frame generating apparatus according to claim 6, wherein the extracting compares the sum of absolute difference corresponding to the motion vector with sums of absolute difference corresponding to two motion vectors adjacent to the motion vector in the vertical direction.

10. The interpolated frame generating apparatus according to claim 6, wherein the extracting extracts a motion vector detected by the first detecting section as a potential motion vector used by the generating section, when the motion vector detected by the first detecting section has a minimum value of sum of absolute difference within a predetermined range from an origin point on a motion vector space.

* * * * *